(12) United States Patent
Keller

(10) Patent No.: US 9,348,564 B2
(45) Date of Patent: May 24, 2016

(54) INTELLIGENT DEVICE FRAMEWORK

(71) Applicant: Rockwell Automation Technologies, Inc., Mayfield Heights, OH (US)

(72) Inventor: Michael Robert Keller, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 206 days.

(21) Appl. No.: 13/661,303

(22) Filed: Oct. 26, 2012

(65) Prior Publication Data

US 2013/0055135 A1    Feb. 28, 2013

Related U.S. Application Data

(63) Continuation of application No. 12/507,906, filed on Jul. 23, 2009, now abandoned.

(51) Int. Cl.
*G06F 3/048* (2013.01)
*G06F 9/44* (2006.01)

(52) U.S. Cl.
CPC .............. *G06F 8/36* (2013.01); *G06F 9/4443* (2013.01)

(58) Field of Classification Search
CPC ..... G06F 8/34; G06F 3/0481; G06F 3/04847; G05B 19/0426; G05B 2219/23258
USPC ........................................................ 715/771
See application file for complete search history.

(56) References Cited

U.S. PATENT DOCUMENTS

| | | | | |
|---|---|---|---|---|
| 5,551,055 | A * | 8/1996 | Matheny et al. | 710/62 |
| 5,848,429 | A * | 12/1998 | McEntee | G06F 3/038 715/255 |
| 6,044,217 | A * | 3/2000 | Brealey et al. | 717/107 |
| 6,161,051 | A * | 12/2000 | Hafemann et al. | 700/86 |
| 6,405,364 | B1 * | 6/2002 | Bowman-Amuah | 717/101 |
| 6,408,342 | B1 * | 6/2002 | Moore et al. | 719/330 |
| 6,560,235 | B1 * | 5/2003 | Jones | 370/401 |
| 6,640,249 | B1 * | 10/2003 | Bowman-Amuah | G06F 8/38 709/228 |
| 6,785,730 | B1 * | 8/2004 | Taylor | 709/230 |
| 6,931,625 | B1 * | 8/2005 | Coad et al. | 717/109 |
| 6,999,841 | B1 * | 2/2006 | Rutkowski | 700/181 |
| 7,058,082 | B1 * | 6/2006 | Bhat et al. | 370/466 |
| 7,152,074 | B2 * | 12/2006 | Dettinger et al. | 707/810 |
| 7,269,482 | B1 * | 9/2007 | Shultz | G06F 9/4443 340/988 |
| 7,395,151 | B2 * | 7/2008 | O'Neill et al. | 701/411 |
| 7,398,263 | B2 * | 7/2008 | Dettinger et al. | |
| 7,511,718 | B2 * | 3/2009 | Subramanian et al. | 345/619 |
| 7,539,662 | B2 * | 5/2009 | Dettinger et al. | |
| 7,721,254 | B2 * | 5/2010 | Relyea et al. | 717/109 |
| 7,814,142 | B2 * | 10/2010 | Mamou et al. | 709/203 |

(Continued)

OTHER PUBLICATIONS ("Open Control Architecture for Discrete Manufacturing Automation" by Lopez et al. published 1999.*

(Continued)

*Primary Examiner* — Jessica Chuang
(74) *Attorney, Agent, or Firm* — Amin, Turocy & Watson, LLP

(57) ABSTRACT

The claimed subject matter relates to an architecture that can facilitate consistent experiences with respect to control or configuration of a feature or function of a device. In particular, a reusable graphical user interface (GUI) component can be employed to interact with a specific feature or function of the device rather than to a specific device or application.

16 Claims, 10 Drawing Sheets

(56) References Cited

U.S. PATENT DOCUMENTS

| | | | |
|---|---|---|---|
| 7,849,469 B1* | 12/2010 | Michel et al. | 719/316 |
| 7,856,279 B2* | 12/2010 | Hood et al. | 700/19 |
| 7,925,490 B2* | 4/2011 | Calvez | 703/17 |
| 7,991,782 B2* | 8/2011 | Dettinger et al. | 707/757 |
| 7,991,788 B2* | 8/2011 | Dettinger et al. | 707/783 |
| 8,086,647 B2* | 12/2011 | Dettinger et al. | 707/803 |
| 8,108,366 B2* | 1/2012 | Dettinger et al. | 707/694 |
| 8,170,901 B2* | 5/2012 | Shukla et al. | 705/7.27 |
| 8,185,867 B2* | 5/2012 | Robinson | 717/109 |
| 8,244,702 B2* | 8/2012 | Dettinger et al. | 707/700 |
| 8,255,875 B2* | 8/2012 | Chouinard et al. | 717/124 |
| 8,275,803 B2* | 9/2012 | Brown et al. | 707/802 |
| 8,292,811 B2* | 10/2012 | Relkuntwar et al. | 600/437 |
| 8,370,794 B2* | 2/2013 | Moosmann et al. | 717/104 |
| 8,392,877 B1* | 3/2013 | Chiluvuri | G06F 9/44 717/106 |
| 8,418,072 B1* | 4/2013 | Bauer et al. | 715/764 |
| 8,533,233 B2* | 9/2013 | Deininger et al. | 707/802 |
| 8,615,527 B2* | 12/2013 | Dettinger et al. | 707/781 |
| 9,058,177 B2* | 6/2015 | Chiluvuri | G06F 8/36 |
| 2003/0058277 A1* | 3/2003 | Bowman-Amuah | 345/765 |
| 2003/0167274 A1* | 9/2003 | Dettinger et al. | 707/100 |
| 2003/0172056 A1* | 9/2003 | Dettinger et al. | 707/3 |
| 2003/0200532 A1* | 10/2003 | Gensel | G06F 8/71 717/120 |
| 2004/0021679 A1* | 2/2004 | Chapman et al. | 345/700 |
| 2005/0015361 A1* | 1/2005 | Payton et al. | 707/3 |
| 2005/0050068 A1* | 3/2005 | Vaschillo et al. | 707/100 |
| 2005/0065952 A1* | 3/2005 | Dettinger et al. | 707/101 |
| 2005/0091231 A1* | 4/2005 | Pal et al. | 707/100 |
| 2005/0159828 A1* | 7/2005 | Deininger et al. | 700/87 |
| 2005/0183090 A1* | 8/2005 | Hunt | 719/310 |
| 2005/0209770 A1* | 9/2005 | O'Neill et al. | 701/117 |
| 2005/0267651 A1* | 12/2005 | Arango et al. | 701/3 |
| 2006/0047464 A1* | 3/2006 | Kumar et al. | 702/122 |
| 2006/0074730 A1* | 4/2006 | Shukla et al. | 705/8 |
| 2006/0074732 A1* | 4/2006 | Shukla | G06F 8/36 717/106 |
| 2006/0095440 A1* | 5/2006 | Dettinger et al. | 707/100 |
| 2006/0149706 A1* | 7/2006 | Prang et al. | 707/2 |
| 2006/0224250 A1* | 10/2006 | Callaghan | 700/1 |
| 2007/0067767 A1* | 3/2007 | Da Silva Neto | 717/174 |
| 2007/0168060 A1* | 7/2007 | Nixon et al. | 700/83 |
| 2008/0114798 A1* | 5/2008 | Robinson | 707/101 |
| 2008/0188956 A1* | 8/2008 | Hood et al. | 700/32 |
| 2009/0113460 A1* | 4/2009 | Parrish et al. | 719/328 |
| 2009/0210781 A1* | 8/2009 | Hagerott | G06F 9/4443 715/234 |
| 2009/0282384 A1* | 11/2009 | Keppler | 717/104 |
| 2009/0287678 A1* | 11/2009 | Brown et al. | 707/5 |
| 2009/0328062 A1* | 12/2009 | Ganesan et al. | 719/315 |
| 2010/0083232 A1* | 4/2010 | Chouinard et al. | 717/124 |
| 2010/0165878 A1* | 7/2010 | Soni | 370/254 |
| 2011/0093800 A1* | 4/2011 | Gottwald | G06F 8/38 715/763 |
| 2012/0166980 A1* | 6/2012 | Yosef | G06F 17/00 715/762 |
| 2012/0272215 A1* | 10/2012 | Chouinard et al. | 717/124 |
| 2013/0007033 A1* | 1/2013 | Brown et al. | 707/764 |
| 2013/0145348 A1* | 6/2013 | Agovic et al. | 717/120 |
| 2015/0179141 A1* | 6/2015 | Dabhi | G09G 5/06 345/594 |

OTHER PUBLICATIONS

EDDL Technical Description ("EDDL Technical Description" by eddl.org; pub date: Jun. 1, 2007; http://eddl.org/SiteCollectionDocuments/wp_EDDL-technical-description-rF.pdf; last accessed Nov. 2, 2014.*

OA dated May 16, 2012 for U.S. Appl. No. 12/507,906, 51 pages.

OA dated Jan. 5, 2012 for U.S. Appl. No. 12/507,906, 38 pages.

* cited by examiner

INTELLIGENT DEVICE FRAMEWORK

CROSS-REFERENCE TO RELATED APPLICATIONS

This application is a continuation of U.S. application Ser. No. 12/507,906, filed on Jul. 23, 2009, entitled "INTELLIGENT DEVICE FRAMEWORK," the entirety of which is incorporated herein by reference.

TECHNICAL FIELD

The claimed subject matter relates generally to reusable graphical user interface (GUI) components and more particularly providing consistent interface features that are potentially both application- and device-independent.

BACKGROUND

Today many configurable components or devices, such as intelligent devices for industrial control or automation systems, are supported by a mixture of various device-specific, data-specific, and/or network-specific application tools. These tools provide an inconsistent and widely varied set of features and functions depending on the selected software application's focus and the devices supported by that application. In many cases the exact same device feature is supported in a completely different manner in a different software application or on different devices that provide the identical or similar feature or function.

In addition not all software applications support the same set of devices or provide the same set of features. The result is that the user experience relative to a given configurable component (e.g., intelligent devices) varies widely from device to device and from software application to application. For example the user experience relative to configuring a particular motor starter by using one widely known configuration package can be significantly different than when performing the exact same operation on the exact same device in another available configuration package. Accordingly, configuration for a diverse set of components or devices can entail a great deal of expense for numerous monolithic packages and can also be confusing or frustrating to users who must switch between different applications with different interfaces, instructions, and feature sets when managing this set of components or devices.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can facilitate consistent experiences with respect to control or configuration of a particular feature or function of one or more components or devices. In accordance therewith and to other related ends, the architecture can provide an interface that can be adapted to operatively couple to one or more configurable components/devices. Furthermore, the architecture can include a reusable graphical user interface (GUI) component that facilitates control or configuration of a feature or function associated with the configurable components/devices. In addition, the architecture can provide a component (e.g., package or application) that can be configured to present a visual representation of the reusable GUI component.

The visual presentation of the reusable GUI component can therefore be the same regardless of the composition of the host package or application and irrespective of the type or nature of the device. Hence, assuming the desired feature or function to be configured is the same (or similar), then the visual representation for the reusable GUI component can be presented in a manner that is substantially independent of the host application or the target device. These aspects can facilitate consistent experiences and intuitive control when switching between packages/applications or between different devices. Moreover, the architecture can also facilitate reusable GUI components that can also provide a means whereby target components or devices can be supported by unrelated applications or packages.

Integration within a given host application or package can be achieved by providing an adapter or "wrapper" (potentially, but not necessarily, application-specific) around the reusable GUI component. The wrapper can allow the reusable GUI component to interact with the host application in a manner that is consistent with its application context.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
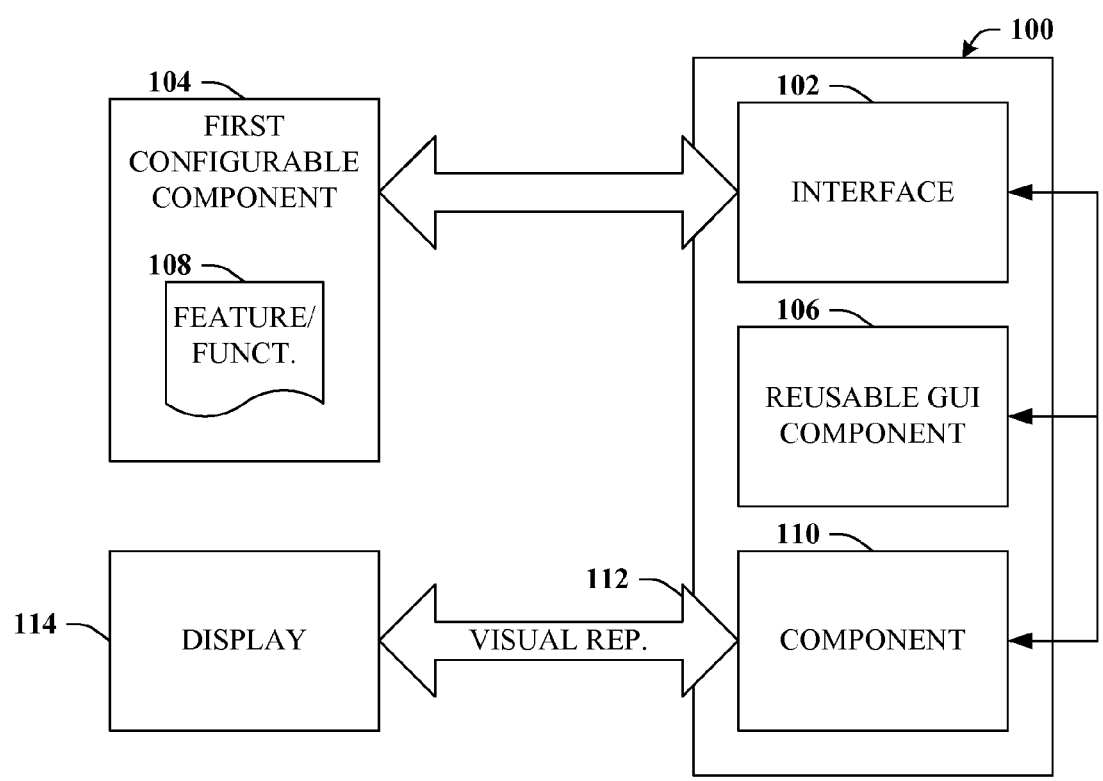
FIG. 1 illustrates a block diagram of a computer-implemented system that can facilitate a consistent user experience with respect to control or configuration of a device-level feature or function of a component or device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, with reference initially to FIG. 1, computer-implemented system 100 that can facilitate a consistent user experience with respect to control or configuration of a device-level feature or function of a component or device is depicted. Generally, system 100 can include interface 102 that can be adapted to operatively couple to first configurable component 104. Hence, interface 102 can be employed to facilitate communication of information to or from first configurable component 104, such as when updating or configuring first configurable component 104 or when polling first configurable component 104 to retrieve various data.

In addition, system 100 can also include reusable graphical user interface (GUI) component 106 that can facilitate control or configuration of a feature or function (e.g., feature/function 108) associated with first configurable component 104. Furthermore, system 100 can include component 110 that can be configured to present visual representation 112 (e.g., a common or consistent graphical depiction) of reusable GUI component 106, wherein visual presentation 112 can be substantially any form of media experience, including output to display 114.

First configurable component 104 can be, e.g., substantially any suitable component, either hardware or software. Likewise, feature/function 108 can thus be substantially any device-level feature or function of first configurable component 104 that can be configured or controlled. According to one or more aspects, however, first configurable component 104 can be specifically directed to an industrial control device and/or intelligent automation device. For instance, first configurable component 104 can be, e.g., a motor overload, a soft starter, a drive, an I/O module, or another type of intelligent device utilized in industrial control or automation systems, which is further detailed in connection with FIG. 2A.

In one or more aspects of the claimed subject matter, reusable GUI component 106 can be constructed to conform to a .NET-based protocol. Additionally or alternatively, reusable GUI component 106 can be constructed to conform to a common object model (COM)-based protocol or standard, or to another suitable standard or protocol. COM and .NET are well-known software and device-implementable standards, which, along with various aspects of reusable GUI component 106, are illustrated in more detail with reference to FIG. 2B.

In accordance therewith, reusable GUI component 106 can thus describe a visual object, screen, or window that facilitates control or configuration of feature/function 108 in a consistent manner, which can be specifically directed to a single feature/function 108 rather than directed to first configurable component 104. Put another way, reusable GUI component 106 can be substantially independent of the type of device or component being configured (e.g., first configurable component 104) and focus instead upon configuration of a particular feature or function. For example, reusable GUI component 106 can be directed to, say, setting a certain revolutions-per-minute (RPM) for a motor or drive. Appreciably, many devices or components include configurable settings for RPM, even though these components as a whole might otherwise be quite diverse from one another.

Thus, by creating reusable GUI component 106 in a manner that focuses on control or configuration of feature/function 108 (e.g., setting RPM) rather than on control of first configurable component 104 as a whole, a number of advantages can be provided over current monolithic approaches to component or device configuration. In particular, reusable GUI component 106 can be used with substantially any other device or component that maintains a configurable setting for the same or comparable features/function 108. In other words, reusable GUI component 106 can facilitate consistent control or configuration of a similar or identical feature or function associated with a second configurable component (not shown), wherein the second configurable component differs in one or more of type, class, make, or model from first configurable component 104.

Therefore, in addition to enabling a single GUI component 106 to adjust a certain feature or function extant on potentially multiple disparate or distinct components or devices, reusable GUI component 106 can also configure and/or provide a standard interface for configuration of similar features. For example, although two features might not be identical, they might be similar enough in terms of inputs or controls and/or it might be intuitive for users to utilize or view a common GUI in connection with both features. Such an advantage marks a significant improvement over existing technologies, given that users need not learn or remember multiple interfaces or control programs or utilities to configure a particular feature/function 108 for multiple devices (potentially from different manufacturers/vendors).

Appreciably, the above-mentioned advantage can apply not only to end-users, but to developers as well in that a single reusable GUI component 106 can be created once and reused for numerous components or devices (those with the suitable feature/function 108), and therefore reduce duplicative engineering efforts. Thus, a manufacturer can develop a single reusable GUI component 106, say, to modify RPM, which can be reused in connection with an entire line of products that include a configurable RPM setting, both products from the manufacturer as well as competitors. Moreover, the convenience and consistency that can be provided to the end-user can serve to drive end-users to purchase products from any manufacturer who supplies reusable GUI component 106.

Figure 2A:
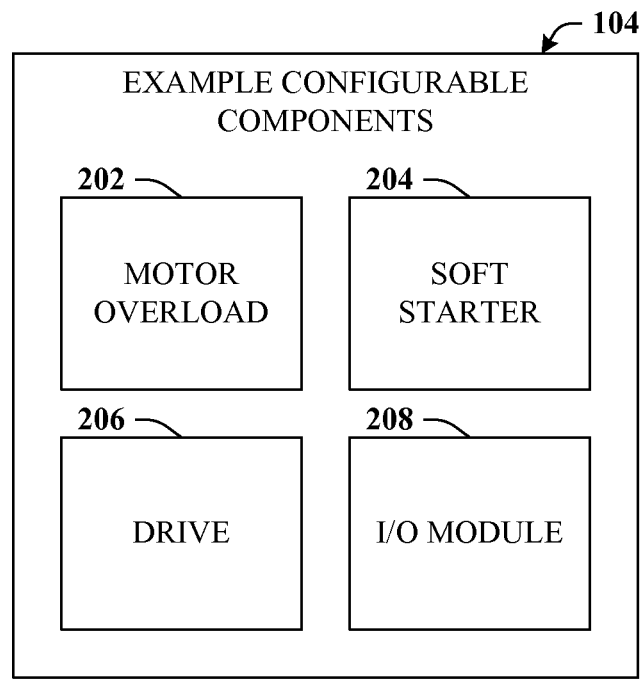
FIG. 2A depicts example configurable components that can be configured or controlled by employing reusable GUI component 106.
Figure 2B:
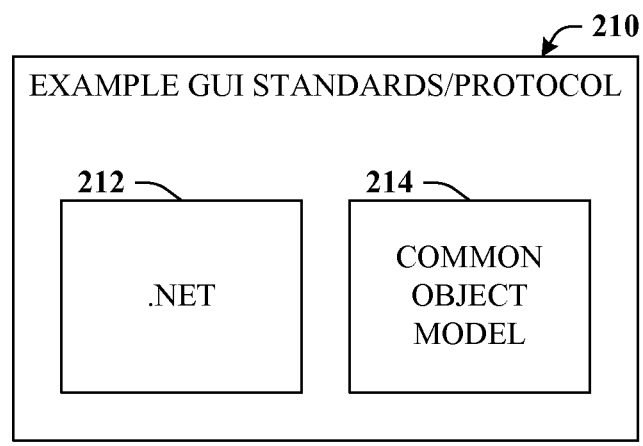
FIG. 2B illustrates example GUI standards or protocols 210 that can be employed to suitably construct reusable GUI component 106.

Turning now to FIGS. 2A and 2B, various examples are provided in connection with first configurable component 104 and reusable GUI component 106. It should be appreciated that these examples are intended to represent suitable concrete instances, yet are also intended to be merely illustrative and therefore not necessarily limiting. In particular, FIG. 2A depicts example configurable components that can be configured or controlled by employing reusable GUI component 106, such as e.g., first configurable component 104. As briefly noted above, these example components can include intelligent devices such as motor overload 202, soft starter 204, drive 206, I/O module 208 or the like. On the other hand, FIG. 2B illustrates example GUI standards or protocols 210 that can be employed to suitably construct reusable GUI component 106. As depicted here and introduced supra, reusable GUI component 106 can be implemented by way of, e.g., .NET technologies 212, COM technologies 214, or another suitable protocol that supports objects, modeling, and/or extensibility.

Figure 3:
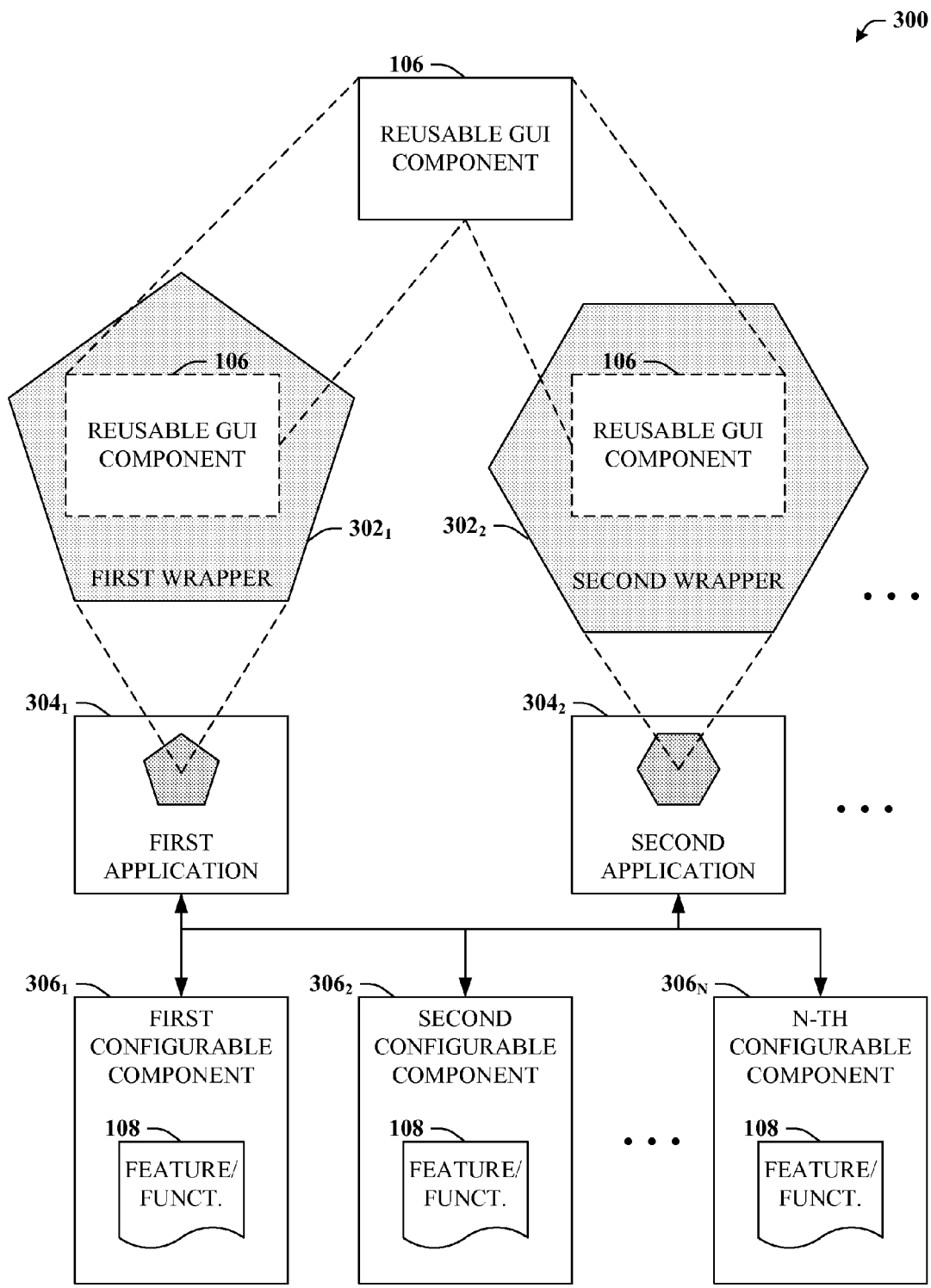
FIG. 3 is a block diagram of a system that can provide additional aspects or detail in connection with a consistent user experience for control or configuration of a feature or function of a component or device.

Referring now to FIG. 3, system 300 illustrates additional aspects or detail in connection with a consistent user experience for control or configuration of a feature or function of a component or device. In general, system 300 depicts reusable GUI component 106 that can facilitate control or configuration of feature/function 108 as discussed previously. This feature/function 108 (or a like feature/function) can be extant in one or more configurable devices or components $306_1$-$306_N$, where N can be any positive integer. Thus, for each configurable component $306_1$-$306_N$ (hereinafter referred to either collectively or individually as configurable component(s) 306 with suitable subscripts used generally only when needed to avoid confusion) that includes an identical or similar feature/function 108, reusable GUI component 106 can facilitate management or control of that particular configurable component 306.

In addition to consistent operation with respect to multiple configurable components 306, reusable GUI component 106 can also be endowed with the ability to be seamlessly hosted by various applications $304_1$, $304_2$, and so on (referred to individually or collectively as applications 304). These applications 304 can be representative of component 110 of FIG. 1 and can be existing configuration utilities, typically of a monolithic variety, developed for interacting with a very specific component 306 or class of components 306, which can be substantially similar to that described in connection with first configurable component 104 of FIG. 1.

Thus, consider the case in which first application $304_1$ is tailored for interacting with first configurable component $306_1$, while second application $304_2$, possibly that of a competing package, is tailored to interact with second configurable component $306_2$. A given user who desires to configure feature/function 108 will typically be required to be familiar with both applications 304 in order to accomplish that task for both configurable components 306 even though the feature/function 108 might be identical for both configurable components 306.

In contrast, however, by hosting reusable GUI component 106 within these applications 304, such need not be the case. Rather, the user in the above example need only be familiar with a single visual interface provided by the single reusable GUI component 106. In the latter case, a developer need only construct a GUI once, which can be reused as necessary or feasible, and the end-user need only familiarize herself with that reusable GUI component 106 in order to configure feature/function 108 irrespective of which configurable component 306 is targeted or which application 304 is employed. Moreover, it can also be possible in some cases for first application $304_1$ to configure features/function 108 of second configurable component $306_2$, even though first application $304_1$ was specifically constructed for interacting with first configurable component $306_1$, and might not otherwise be compatible with second configurable component $306_2$.

In accomplishment of the foregoing, system 300 (or system 100, et al.) can further comprise first wrapper $302_1$ that can plug into first application $304_1$ in order to provide compatibility between first application $304_1$ and reusable GUI component 106. In other words, first application $304_1$ can host reusable GUI component 106 so that reusable GUI component 106 can interact with one or more configurable components 306 and also be represented to a user. Appreciably, neither first application $304_1$ nor reusable GUI component 106 need be expressly compatible, as first wrapper $302_1$ can ensure that reusable GUI component 106 operates within the existing parameters or constraints associated with first application $304_1$.

In fact, application(s) 304 can be independent third party applications, and the described aspects can operate without any update to these applications 304. However, it should be understood that although only a single reusable GUI component 106 need be required, different wrappers 302 might be necessary to allow different applications 304 to host reusable GUI component 106, which is illustrated by second wrapper 302₂ used to allow second application 304₂ to host reusable GUI component 106. Such might be the case when second application 304₂ differs in type, brand, vendor, or provider from first application 304₁. Yet it should be appreciated that in cases where applications 304 conform to an international standards designation associated with, say, industrial automation or control of a device or feature thereof, it can be possible for a single wrapper 302 to function within the framework of diverse applications 304.

Figure 4:
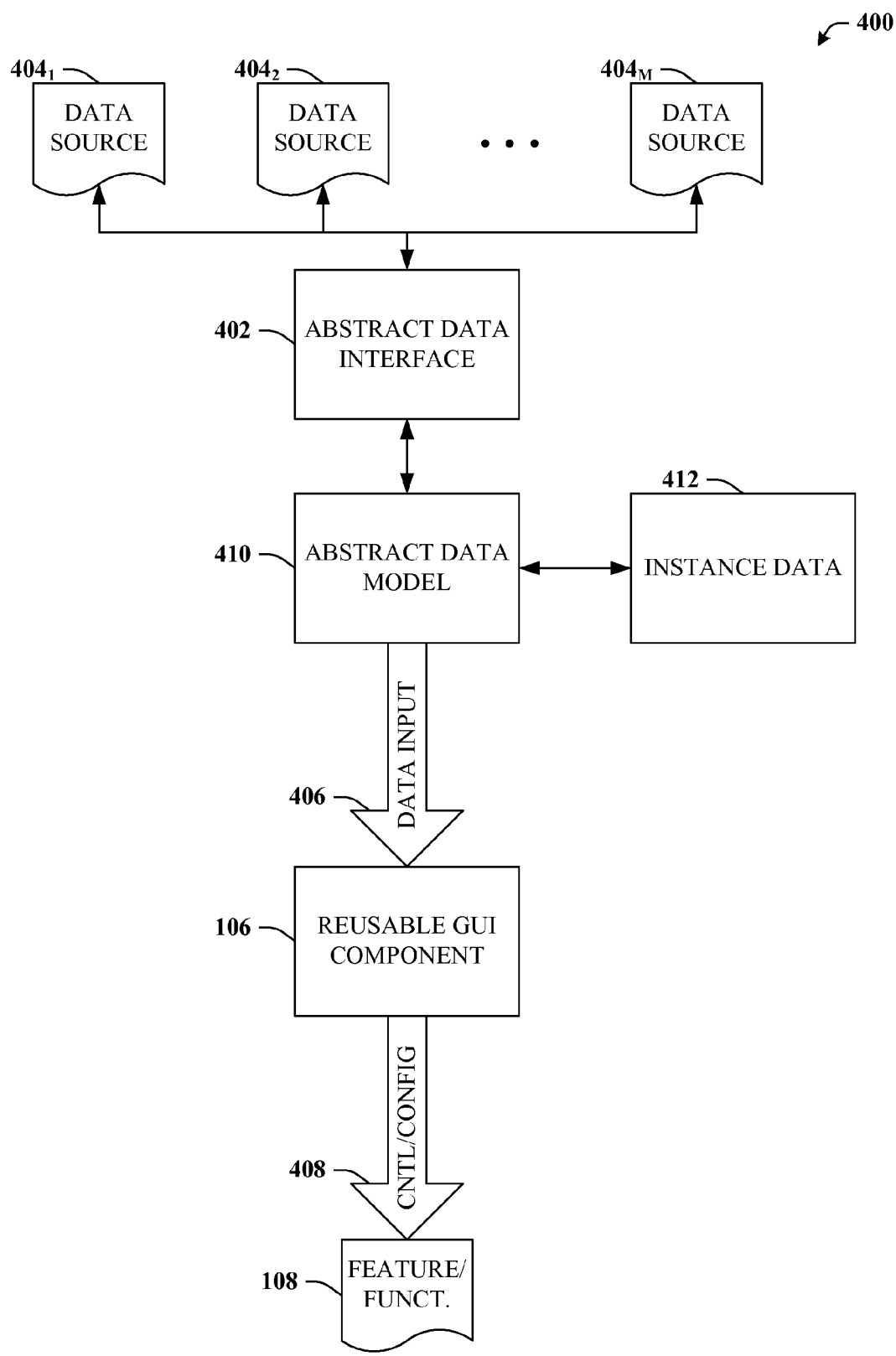
FIG. 4 depicts a block diagram of a system that provides an abstract data representation for devices or components that are defined by potentially dissimilar data sources.

With reference now to FIG. 4, system 400 that can obtain configuration data in an abstract manner is provided. In particular, the systems detailed supra can further include abstract data interface 402. Abstract data interface 402 can facilitate compatibility with multiple data source types, which are labeled data sources $404_1$-$404_M$, but can be referred to hereinafter individually or collectively as data sources 404. These data sources 404 can act, e.g., as data inputs 406 to reusable GUI component 106 in connection with control or configuration 408 of feature/function 108.

For example, data source(s) 404 received by abstract data interface 402 can be fed into abstract data model 410. These data can provide the class data of the devices/components (e.g., first configurable device 104), but not necessarily the instance data 412. Various examples of such can include, e.g., electronic data sheet (EDS), electronic device description language (EDDL), or the like, and will typically be (class) data descriptions. Accordingly, abstract data model 410 can take the data (class) descriptions and provides a generalized method for presenting the class model to reusable GUI component 106, as well as other interfaces within the framework. As a concrete example, both EDS and EDDL have a method for describing a device "parameter". Abstract data model 410 can provide a single abstract representation of a "parameter" that the framework utilizes. Such a representation potentially divorces the framework from having to determine whether the originator of the "parameter" data was an EDS file or an EDDL file.

Accordingly, data services provided within the described framework can allow reusable GUI component 106 as well as application-specific wrappers 302 to interact with a variety of devices or components 306 in a common and consistent manner, potentially independent of the underlying data model. Thus, any potential data service can provide a common abstract interface (e.g., abstract data interface 402) to substantially any variety of data sources 404. This can allow data models to be extended by plugging in support for new models and interfaces without affecting the overall framework or requiring updates to existing software components within the framework.

Moreover, control or configuration information can persist within the described framework. In particular, the framework can provide for storage of device or component instance-specific configuration information, for instance, by way of instance data 412 maintained in memory (not shown). Accordingly, instance data 412 can be manipulated to provide for control or configuration of a suitable component or device (e.g., first configurable component 104) even when no active connection or communication session exists with the component and/or the component is offline. Thus, the described framework can support a persistence model that can be managed by the framework itself. Furthermore, the framework can provide component or device instance data that can be managed by the host application (e.g., application 304). Hence, the claimed subject matter can be applicable to and/or support both online and offline configuration, and can further provide flexible options for how the host application can persist instance data 412.

Figure 5:
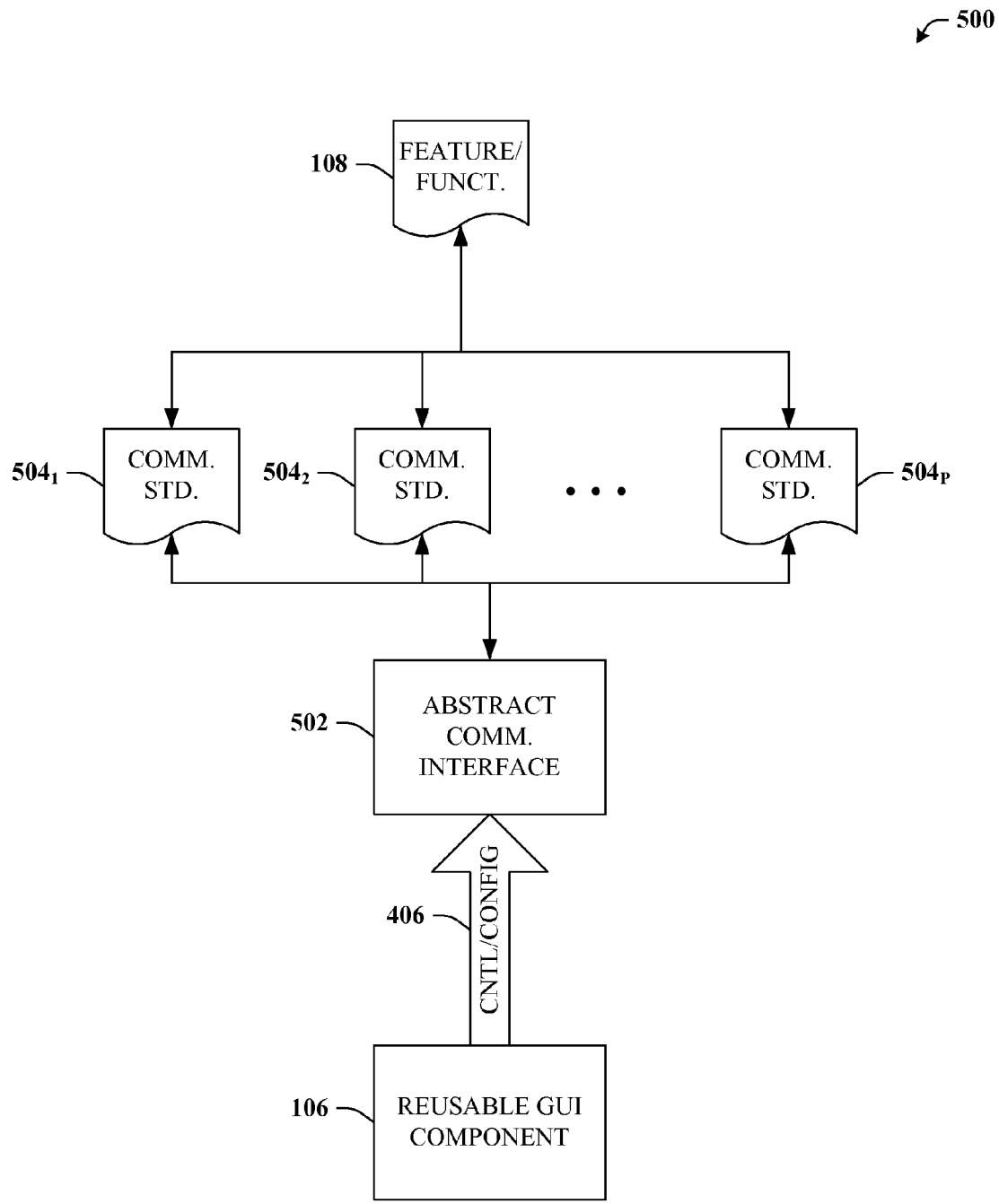
FIG. 5 illustrates a block diagram of a system that can control or configure devices or components independent of a communications framework.

Similarly, turning briefly to FIG. 5, system 500 that can control or configure devices or components independent of a communications framework is depicted. For example, any or all of the systems detailed previously or otherwise herein can further include abstract communication interface 502. For instance, interface 102 of FIG. 1 can be abstract communication interface 502 described here. Abstract communication interface 502 can facilitate compatibility with multiple communications protocols or standards, which are denoted communications standards $504_1$-$504_P$, and generally referred to as simply communications standard(s) 504. Appreciably, control or configuration 406 commands can be propagated from reusable GUI component 106 (or a hosting application 304) to abstract communication interface 502. Abstract communication interface 502 can then propagate these data to the device or component maintaining the desired feature/function 108 to be modified by way of substantially any communication standard 504.

Thus, as with data services discussed with reference to FIG. 4, communication services as well can be provided within the described framework that can allow reusable GUI component 106 as well as application-specific wrappers 302 to interact with a variety of devices or components 306 in a common and consistent manner, potentially independent of the underlying communication standard. Thus, any potential communication service can provide a common abstract interface (e.g., abstract communication interface 502) to substantially allow communication irrespective of the networking topology, protocol, or standard. These features can allow communications models to be extended by plugging in support for new models and interfaces without affecting the overall framework or requiring updates to existing software components within the framework.

Figure 6:
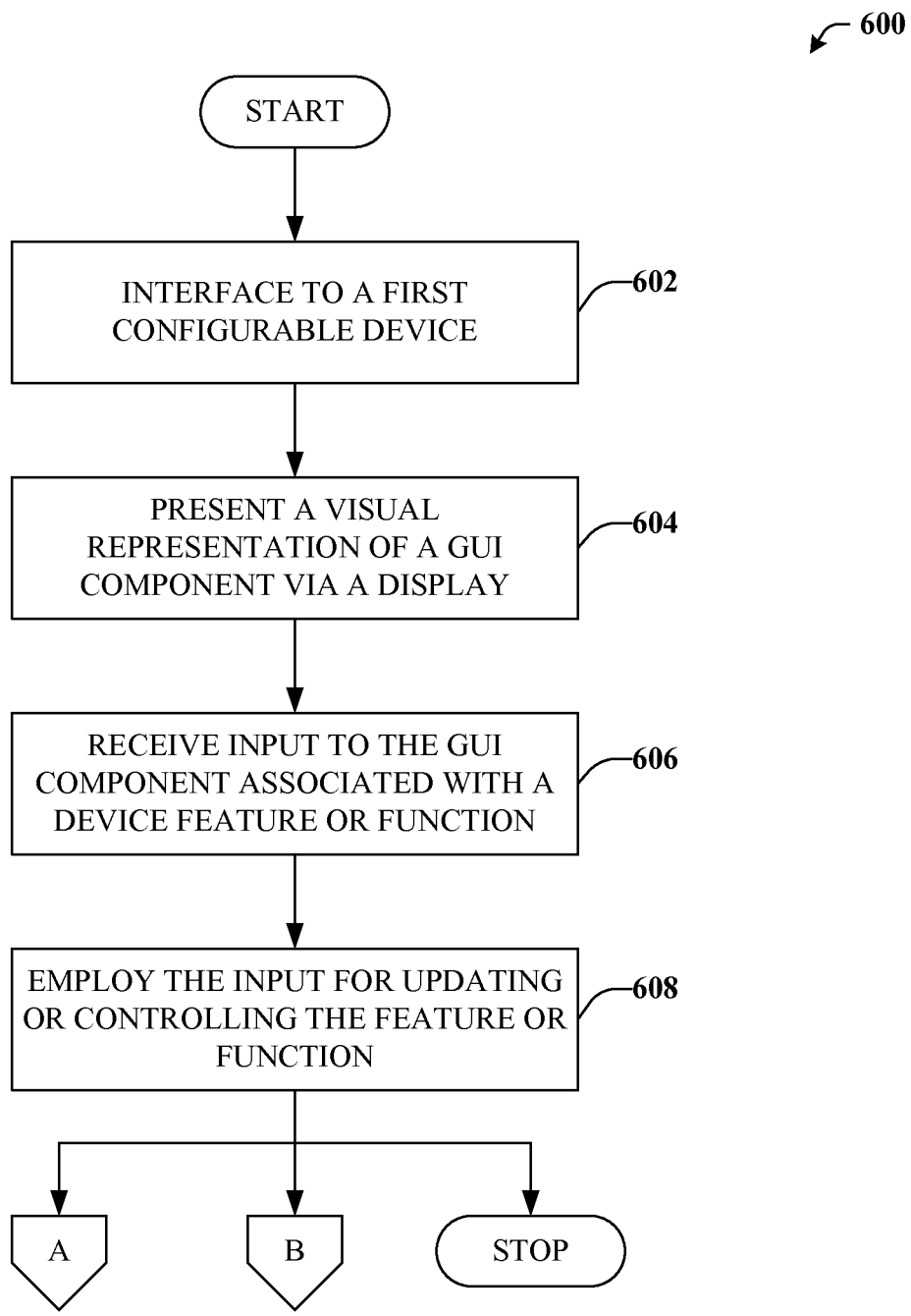
FIG. 6 depicts an exemplary flow chart of procedures that define a method for facilitating consistent user experiences with respect to controlling or configuring a feature or function of a device.
Figure 7:
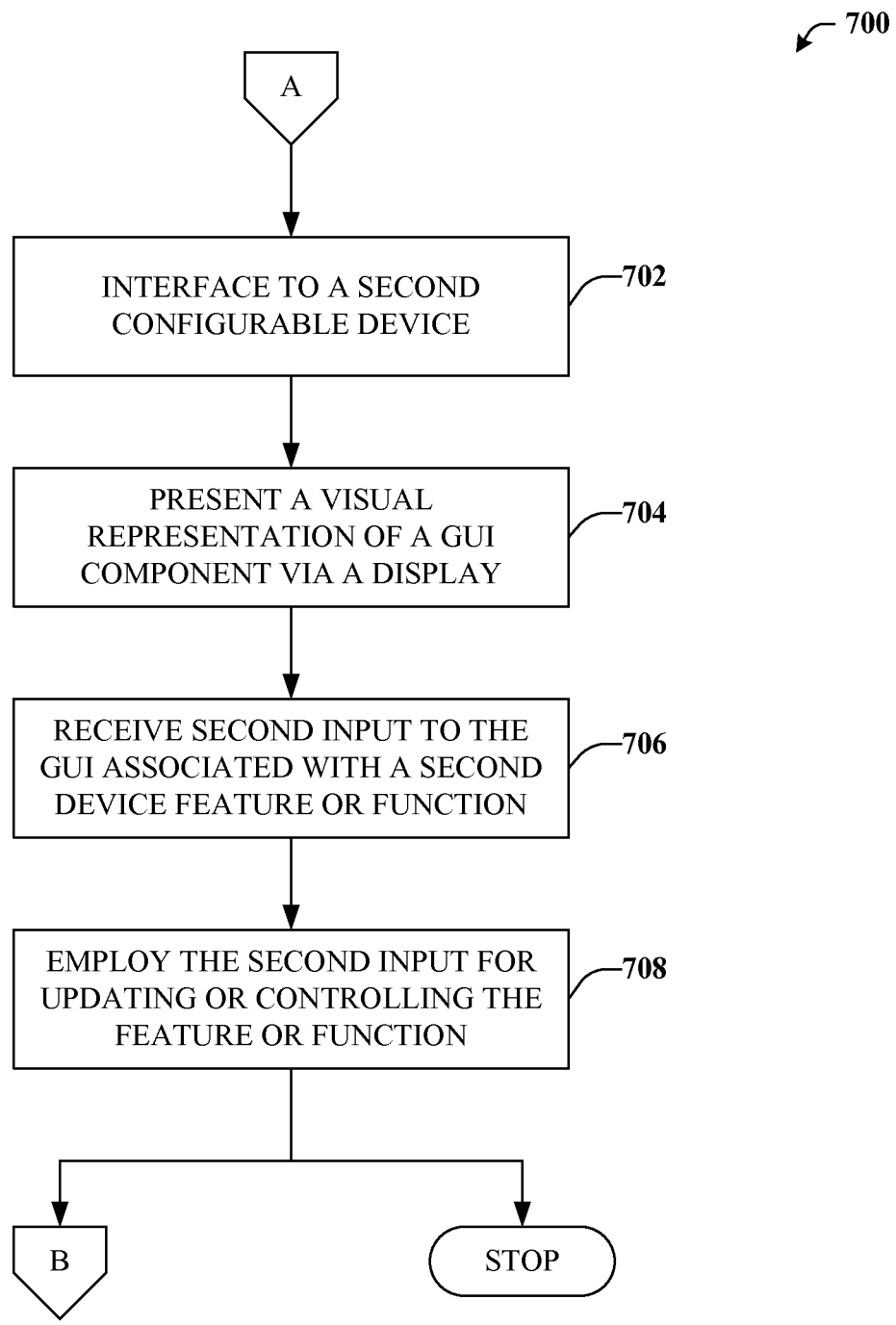
FIG. 7 illustrates an exemplary flow chart of procedures that define a method for facilitating consistent user experiences with respect to controlling or configuring an identical or similar feature or function across multiple devices.
Figure 8:
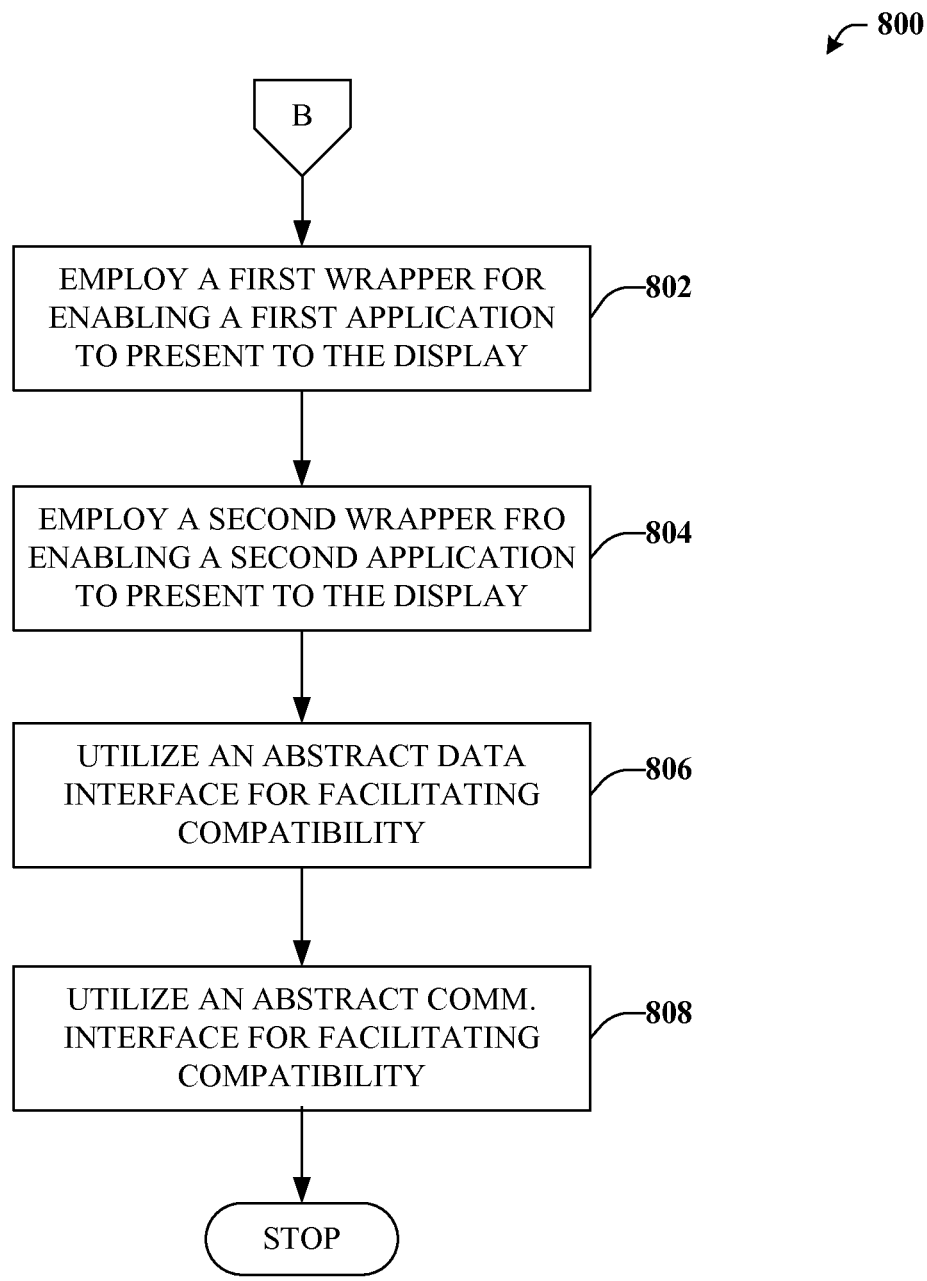
FIG. 8 depicts an exemplary flow chart of procedures defining a method for providing additional features in connection with facilitating consistent user experiences with respect to controlling or configuring a feature or function of a device.

FIGS. 6, 7, and 8 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 6, exemplary computer implemented method 700 for facilitating consistent user experiences with respect to controlling or configuring a feature or function of a device is provided. Generally, at reference numeral 602, a first configurable device can be interfaced to. Typically, the first configurable device can be substantially any configurable component, but can in some cases be limited to industrial control intelligent devices such as a motor overload, a soft starter, a drive, an I/O module, or the like.

Accordingly, at reference numeral 604, a visual representation of a reusable GUI component can be presented, e.g., to a user who desires to interact with the first configurable device, by way of a display. Therefore, at reference numeral 606, input to the reusable GUI component can be received, potentially provided by the user. The input can be associated with a feature or function of the first configurable device. At reference numeral 608, the input can be employed for updating or controlling the feature or function of the first configurable device such that the feature or function can be updated or controlled in a manner that provides consistent experiences.

Referring to FIG. 7, exemplary computer implemented method 700 for facilitating consistent user experiences with respect to controlling or configuring an identical or similar feature or function across multiple devices is depicted. At reference numeral 702, a second configurable device, potentially diverse from the first configurable device in terms of type, class, make, or model, can be interfaced to.

At reference numeral 704, the visual representation of reusable GUI component detailed at reference numeral 604 can be presented, either on the same or a disparate display. Next to be described, at reference numeral 706, second input to the reusable GUI component can be received, wherein the second input can be associated with a feature or function of the second configurable device. Thus, at reference numeral 708, the second input can be employed for updating or controlling the feature or function of the second configurable device. Appreciably, the same GUI component can be employed to update or control the device-level feature (either identical or suitably similar) extant on both the first and the second configurable devices.

Turning now to FIG. 8, method 800 for providing addition features in connection with facilitating consistent user experiences with respect to controlling or configuring a feature or function of a device is illustrated. At reference numeral 802, a first wrapper can be employed for enabling a first application to present the visual representation of the reusable GUI component by way of one or more displays. The first wrapper can be application-specific and thus constructed expressly for use with the first application. Additionally or alternatively, the first wrapper can conform to or leverage certain standards for potential compatibility with multiple diverse applications. It should be appreciated that the described wrapper concept is significantly different than conventional approaches. In the standards approach, all applications and plug-in components are required to implement the standard interface as specified in the associated standard or protocol. In contrast, the reusable GUI component (and underlying framework) need not be altered and need not necessarily follow some promulgated general standard. Hence, the reusable GUI component can be hosted by substantially any application, yet without placing any standard requirement on the host application. Rather, the wrapper can adapt the reusable GUI component and the accompanying framework to the host application.

At reference numeral 804, a second wrapper, typically distinct from the first wrapper (e.g., application specific), can be employed for enabling a second application, distinct from the first application, to present the visual representation of the reusable GUI component by way of one or more displays. Hence, again, the same GUI component can be employed to update or control the device-level feature extant on both the first and the second configurable devices by being hosted in multiple applications.

In addition, at reference numeral 806, an abstract data interface can be utilized for facilitating compatibility with multiple disparate data source types. These multiple disparate data source types can serve as inputs to the reusable GUI device, e.g., for control or configuration of the feature or function of the first configurable device. Likewise, at reference numeral 808, an abstract communication interface can be utilized for facilitating compatibility with multiple communication protocols or standards when interfacing to the first configurable device.

Figure 9:
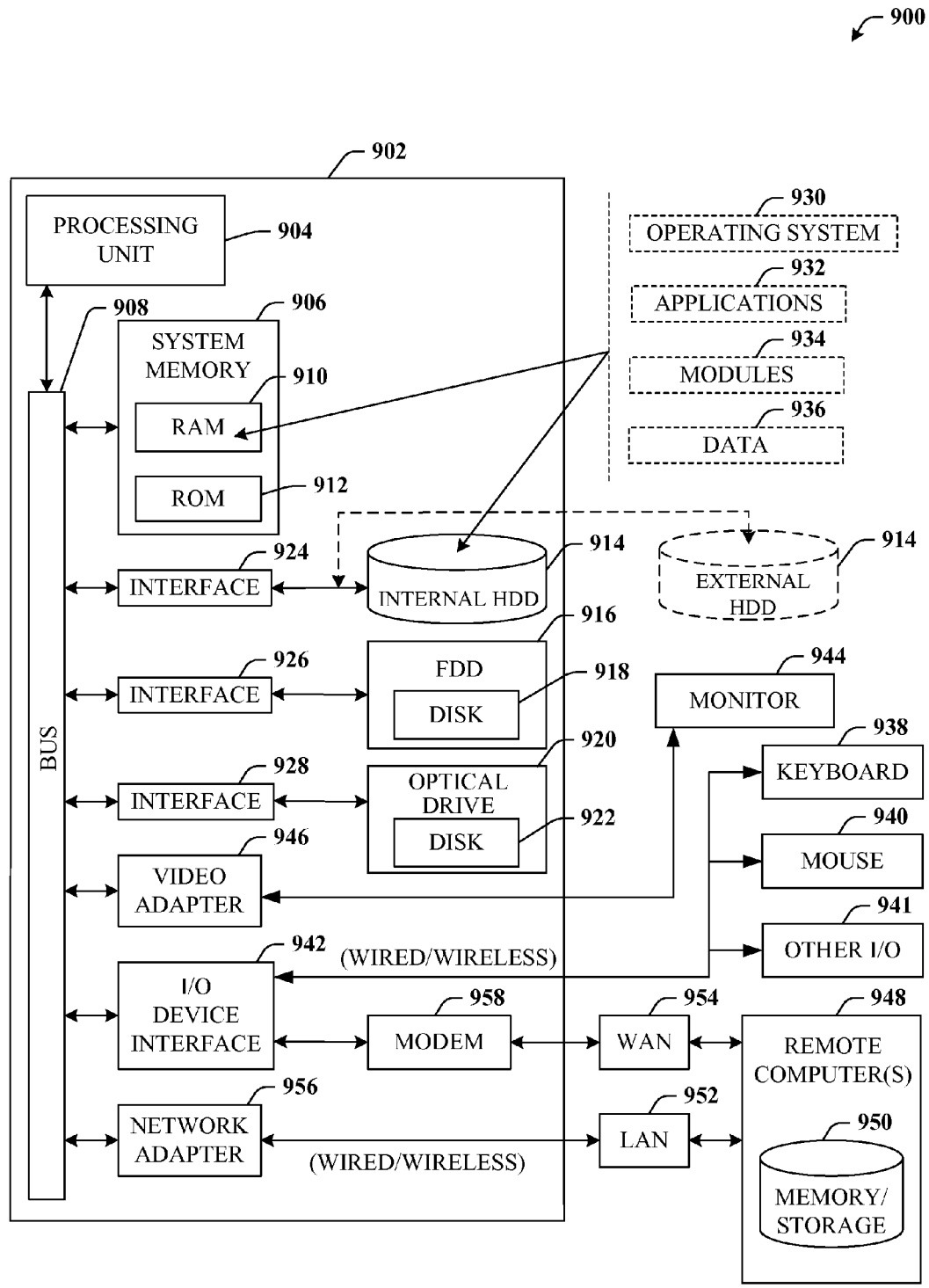
FIG. 9 illustrates a block diagram of a computer operable to execute or implements all or portions of the disclosed architecture.

Referring now to FIG. 9, there is illustrated a block diagram of an exemplary computer system operable to execute the disclosed architecture. In order to provide additional context for various aspects of the claimed subject matter, FIG. 9 and the following discussion are intended to provide a brief, general description of a suitable computing environment 900 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the claimed subject matter includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the claimed subject matter can be implemented with various commercially available operating systems or combinations of operating systems.

A user can enter commands and information into the computer 902 through one or more wired/wireless input devices, e.g., a keyboard 938 and a pointing device, such as a mouse 940. Other input devices 941 may include a speaker, a microphone, a camera or another imaging device, an IR remote control, a joystick, a game pad, a stylus pen, touch screen, or the like. These and other input devices are often connected to the processing unit 904 through an input-output device interface 942 that can be coupled to the system bus 908, but can be connected by other interfaces, such as a parallel port, an IEEE1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, a mobile device, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 9 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 10:
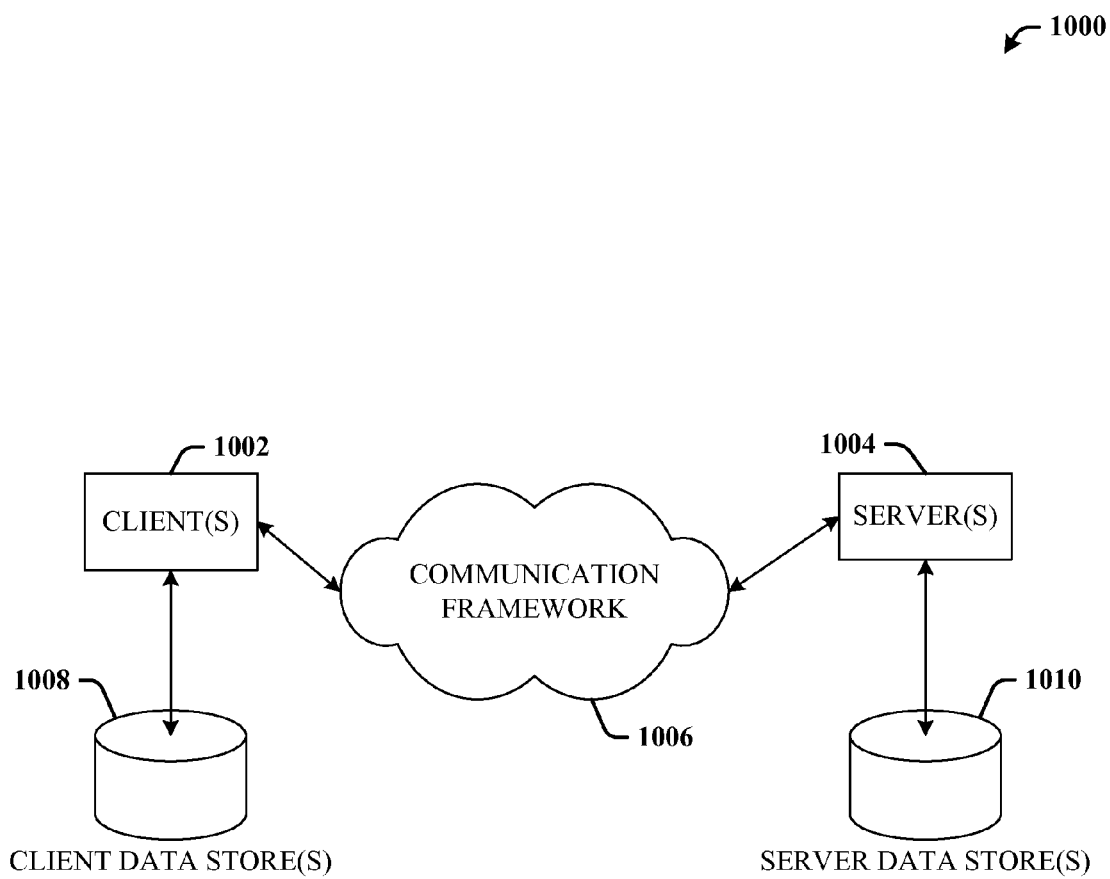
FIG. 10 illustrates a schematic block diagram of an exemplary computing environment.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
a processor;
a memory communicatively coupled to the processor, the memory having stored therein computer-executable instructions, comprising:
a reusable framework embedded in a host application of a plurality of distinct host applications, wherein the reusable framework is embeddable in the plurality of distinct host applications, wherein the reusable framework comprises:
an abstract data model that translates a plurality of class data descriptions for a parameter from the plurality of distinct host applications and a plurality of distinct industrial automation components into a single abstract representation of the parameter and translates the single abstract representation of the parameter to the plurality of class data descriptions;
an abstract data interface that converts different data sources into the abstract data model as a data input to the plurality of distinct industrial automation components;
an abstract communication interface that communicates with the plurality of distinct host applications and the plurality of distinct industrial automation components using a plurality of distinct communications protocols to allow interactions among the plurality of distinct host applications and the plurality of distinct industrial automation components in a common and consistent manner;
a reusable graphical user interface component that employs the abstract data interface, the abstract data model and the abstract communication interface to facilitate a configuration of a first industrial automation function of a first industrial automation component of the plurality of distinct industrial automation components using a set of input fields and a configuration of a second industrial automation function of a second industrial automation component of the plurality of distinct industrial automation components using the same set of input fields for the configuration of the first industrial automation function and the second industrial automation function, wherein the first industrial automation function is different than the second industrial automation function, wherein the reusable graphical user interface component is specifically constructed with a visual representation for the first industrial automation function of the first industrial automation component, and the second industrial automation function of the second industrial automation component has a different user interface component with a different visual representation in a different host application for configuring the second industrial automation function;
wherein the reusable graphical user interface component persists configuration information associated with the first industrial automation function of the first industrial automation component and the second industrial automation function of the second industrial automation component; and respective wrappers that enforces an operation of the reusable graphical user interface component within constraints associated with subsets of the plurality of distinct host applications, and the respective wrappers allow the reusable graphical user interface component to interact with the plurality of distinct host applications in a manner that is consistent with each application context.

2. The system of claim 1, wherein the reusable graphical user interface component employs the abstract data interface, the abstract data model and abstract communication interface to facilitate configurations of a plurality of industrial automation functions of the plurality of distinct industrial automation components.

3. The system of claim 2, wherein the reusable graphical user interface component further provides a common presentation of the industrial automation function of the plurality of distinct industrial automation components.

4. The system of claim 1, wherein the reusable graphical user interface component further employs the single abstract representation of the parameter to facilitate the configuration of the first industrial automation function of the first industrial automation component of the plurality of distinct industrial automation components and the second industrial automation function of the second industrial automation component of the plurality of distinct industrial automation components.

5. The system of claim 1, further comprising a first host application having the reusable framework for the configuration of the first industrial automation function of the first industrial automation component, where the first host application is employable for the configuration of the second industrial automation function of the second industrial automation component having an associated second host application having the reusable framework for the configuration of the second industrial automation function of the second industrial automation component.

6. The system of claim 1, wherein the reusable framework is further extended to at least one additional industrial automation component distinct from the plurality of distinct industrial automation components.

7. A method, comprising:
embedding, by a device including a processor, a reusable framework in a host application of a plurality of distinct host applications, wherein the reusable framework is embeddable in the plurality of distinct host applications, wherein the reusable framework comprises:
an abstract data model that translates a plurality of data formats from the plurality of distinct host applications and a plurality of distinct industrial automation components into a single abstract representation of the parameter and translates the single abstract representation of the parameter to the plurality of class data descriptions;
an abstract data interface that converts different data sources into the abstract data model as a data input to the plurality of distinct industrial automation components;
an abstract communication interface that communicates with the plurality of distinct host applications and the plurality of distinct industrial automation components using a plurality of distinct communications protocols to allow interactions among the plurality of distinct host applications and the plurality of distinct industrial automation components in a common and consistent manner;
a reusable graphical user interface component that employs the abstract data interface, the abstract data model and the abstract communication interface to facilitate a configuration of a first industrial automation function of a first industrial automation component of the plurality of distinct industrial automation components and a second industrial automation function of a second industrial automation component of the plurality of distinct industrial automation components using a same set of input fields for the configuration of the first industrial automation function and the second industrial automation function, wherein the first industrial automation function is different than the second industrial automation function, wherein the reusable graphical user interface component is specifically constructed with a visual representation for the first industrial automation function of the first industrial automation component, and the second industrial automation function of the second industrial automation component has a different user interface component with a different visual representation in a different host application for configuring the second industrial automation function;
wherein the reusable graphical user interface component persists configuration information associated with the first industrial automation function of the first industrial automation component and the second industrial automation function of the second industrial automation component; and
respective wrappers that enforces an operation of the reusable graphical user interface component within constraints associated with subsets of the plurality of distinct host applications, and the respective wrappers allow the reusable graphical user interface component to interact with the plurality of distinct host applications in a manner that is consistent with each application context.

8. The method of claim 7, wherein the reusable graphical user interface component employs the abstract data interface, the abstract data model and the abstract communication interface to facilitate configurations of a plurality of industrial automation functions of the plurality of distinct industrial automation components.

9. The method of claim 7, wherein the configuring comprises employing the single abstract representation of the parameter to configure the at least one of the first industrial automation function for the first industrial automation component or the second industrial automation function for the second industrial automation component.

10. The method of claim 9, wherein the configuring further comprises translating the single abstract representation of the parameter to a format of the at least one of the first industrial automation function for the first industrial automation component or the second industrial automation function for the second industrial automation component.

11. The method of claim 7, further comprising extending, by the device, the reusable framework to at least one additional host application distinct from the plurality of distinct host applications.

12. The method of claim 7, further comprising extending, by the device, the reusable framework to at least one additional industrial automation component distinct from the plurality of distinct industrial automation components.

13. A non-transitory computer-readable medium having instructions stored thereon that, in response to execution, cause at least one device including a processor to perform operations comprising:
installing a reusable framework in a host application of a plurality of distinct host applications, wherein the reusable framework is installable in the plurality of distinct host applications, wherein the reusable framework comprises:

an abstract data model that translates a plurality of class data descriptions for a parameter from the plurality of distinct host applications and a plurality of distinct industrial automation components into a single abstract representation of the parameter and translates the single abstract representation of the parameter to the plurality of class data descriptions;

an abstract data interface that converts different data sources into the abstract data model as the data input to the plurality of distinct industrial automation components;

an abstract communication interface that communicates with the plurality of distinct host applications and the plurality of distinct industrial automation components using a plurality of distinct communications protocols to allow interactions among the plurality of distinct host applications and the plurality of distinct industrial automation components in a common and consistent manner;

a reusable graphical user interface component that employs the abstract data interface, the abstract data model and abstract communication interface to facilitate a configuration of a first industrial automation function of a first industrial automation component of the plurality of distinct industrial automation components using a set of input fields and a configuration of a second industrial automation function of a second industrial automation component of the plurality of distinct industrial automation components using the same set of input fields for the configuration of the first industrial automation function and the second industrial automation function, wherein the first industrial automation function is different than the second industrial automation function, wherein the reusable graphical user interface component is specifically constructed with a visual representation for the first industrial automation function of the first industrial automation component, and the second industrial automation function of the second industrial automation component has a different user interface component with a different visual representation in a different host application for configuring the second industrial automation function;

wherein the reusable graphical user interface component persists configuration information associated with the first industrial automation function of the first industrial automation component and the second industrial automation function of the second industrial automation component; and respective wrappers that enforces an operation of the reusable graphical user interface component within constraints associated with subsets of the plurality of distinct host applications, and the respective wrappers allow the reusable graphical user interface component to interact with the plurality of distinct host applications in a manner that is consistent with each application context.

14. The non-transitory computer-readable medium of claim 13, wherein the reusable graphical user interface component employs the abstract data interface, the abstract data model and abstract communication interface to facilitate configurations of a plurality of industrial automation functions of the plurality of distinct industrial automation components.

15. The non-transitory computer-readable medium of claim 13, wherein the configuring comprises employing the single abstract representation of the parameter to configure the at least one of the first industrial automation function for the first industrial automation component or the second industrial automation function for the second industrial automation component.

16. The non-transitory computer-readable medium of claim 15, wherein the configuring further comprises translating the single abstract representation of the parameter to a format of the at least one of the first industrial automation function for the first industrial automation component or the second industrial automation function for the second industrial automation component.

* * * * *